United States Patent [19]

Alesz et al.

[11] Patent Number: 5,700,957
[45] Date of Patent: Dec. 23, 1997

[54] METHOD AND APPARATUS FOR MEASURING MASS FLOW

[75] Inventors: József Alesz; Imre Busznyák; István Glódi; András Kiss; Józsefné Kukta, all of Budapest; Béla Nagy, Budakeszi; Péter Salamon; Elemér Szentpétery, both of Budapest; Zoltán Tóth, Budaörs; Tamás Ujhelyi, Budapest, all of Hungary

[73] Assignee: MMG Automatika Muvek Reszvenytarsasag, Budapest, Hungary

[21] Appl. No.: 592,389

[22] PCT Filed: Aug. 3, 1994

[86] PCT No.: PCT/HU94/00033

§ 371 Date: Feb. 1, 1996

§ 102(e) Date: Feb. 1, 1996

[87] PCT Pub. No.: WO95/04259

PCT Pub. Date: Feb. 9, 1995

[30] Foreign Application Priority Data

Aug. 3, 1993 [HU] Hungary .............. P 93 02236

[51] Int. Cl.⁶ .................................................. G01F 1/78
[52] U.S. Cl. ........................................................ 73/861.357
[58] Field of Search .................... 73/861.355, 861.356, 73/861.357

[56] References Cited

U.S. PATENT DOCUMENTS

| | | | |
|---|---|---|---|
| 4,127,028 | 11/1978 | Cox et al. | 73/194 B |
| 4,187,721 | 2/1980 | Smith | 73/861.356 |
| 4,311,054 | 1/1982 | Cox et al. | 73/861.356 |
| 4,381,680 | 5/1983 | Shiota | 73/861.38 |
| 4,491,025 | 1/1985 | Smith | 73/861.38 |
| 4,655,089 | 4/1987 | Kapelt et al. | 73/861.38 |
| 5,357,811 | 10/1994 | Hoang | 73/861.355 |
| 5,423,221 | 6/1995 | Kane et al. | 73/861.38 |

FOREIGN PATENT DOCUMENTS

| | | | |
|---|---|---|---|
| 0 210 308A2 | 2/1987 | European Pat. Off. | G01F 1/78 |
| 40 16 907 A1 | 11/1981 | Germany | G01F 1/84 |
| 3503841 A1 | 8/1986 | Germany | G01F 1/76 |
| 198566 A | 11/1989 | Hungary | G01F 1/84 |

*Primary Examiner*—Richard Chilcot
*Assistant Examiner*—Jewel V. Artis
*Attorney, Agent, or Firm*—Fitch, Even, Tabin & Flannery

[57] ABSTRACT

Apparatus for measuring mass flow of a fluid stream comprising inlet and outlet conduits for the fluid stream, at least one resilient flow tube having fixed mounting ends communicating with the inlet and outlet conduits, a vibrator for oscillating the flow tube transverse to the axis of the flow tube, sensors for generating signals corresponding to the oscillating motion of the flow tube and a signal processing unit for determining the mass flow from said signals on the basis of the Coriolis reaction force by the fluid against the flow tube. According to the invention the flow tube is formed as a symmetrical loop around the amount ends, said loop providing a change in the direction of flow which is greater than 360°, and vibrator is located on the flow tube at a point adjacent the mounting ends.

Method for measuring mass flow of a fluid stream, wherein the said at least one flow tube is oscillated at a resonant frequency higher than the fundamental resonant frequency of the flow tube.

3 Claims, 4 Drawing Sheets

METHOD AND APPARATUS FOR MEASURING MASS FLOW

TECHNICAL FIELD

The invention relates to a vibratory method and apparatus for measuring mass flow.

BACKGROUND ART

Figure 1:
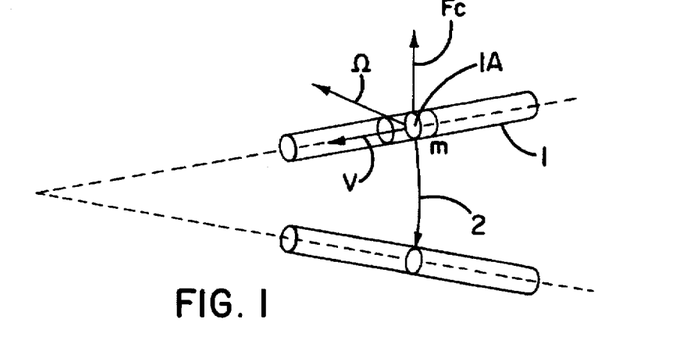
FIG. 1 is a perspective view of a part of a vibrating tube explaining how Coriolis forces are generated.

In the art of measuring mass flow rates of flowing substances it is known that flowing a fluid through an oscillating flexible flow pipe produces Coriolis forces. During vibration, a cross section 1A of a pipe 1 moves along curved path 2 as shown in FIG. 1, therefore, an angular velocity $\Omega$ subject to periodic changes is associated with said cross section 1A. As a result of flow velocity v of the mass m of a fluid portion and said angular velocity $\Omega$, Coriolis force Fc distributed along the vibrating flow pipe 1 will be generated, which Coriolis force is exerted by the flowing medium to the inner wall of the pipe 1. The relationship between the said physical quantities can be expressed by the well-known formula as follows:

$$Fc = 2m.\Omega \times v \quad (1)$$

where x represents the vectorial product of vectors $\Omega$ and v.

By indirect or direct measurement of the Coriolis force expressed above, the mass flow rate through the vibrating pipe can be determined.

The principle of the method of measurement most commonly used consists in the fact that, under the effect of Coriolis force, the state of movement of the vibrating pipes will be changed depending on the flow velocity—including e.g. zero velocity—in the pipes. Any change in the state of motion will be represented by the phase difference between the periodic time functions describing the motion of specified points of the vibrating pipes. Therefore, displacement sensors are arranged at two appropriately selected points of the flow pipes, that supply periodically changing electric signals (S1, S2) characterizing the vibrational movement at said points of the pipes:

$$S1 = f1[A1.\sin(\Omega.t)] \quad (2)$$

$$S2 = f2[A2.\sin(\Omega.t+\Phi)] \quad (3)$$

where S1, S2 are electric signals from movement sensors,

A1, A2 are amplitudes of vibration at the point of sensing, $\Omega$ is the angular frequency of vibration, t is time, $\Phi$ is phase difference, f1, f2 are functions that characterize the movement sensors.

In the practice, optical displacement sensors, electromagnetic velocity sensors or piezoelectric accelerometers are used as movement sensors. In each case, the functions f1 and f2 practically cause the electric signals S1 and S2 to be periodic functions. The information useful for the mass flow rate will be the phase difference $\Phi$ between these two periodic signals. This phase difference $\Phi$ is nearly proportional to the mass flow rate in the range of small angles.

$$Q = K.\Phi \quad (4)$$

where

Q is the mass flow rate [kg/s],

K is a constant [kg/s.rad], $\Phi$ is the phase difference [rad].

A number of types of mass flow meters of vibration principle are known, which contain flow pipes of different form and designed on the known principles described above. Such devices are disclosed e.g. in U.S. Pat. Nos. 4,491,025 and 4,655,089, Hungarian Patent No. 198,566 and European Patent No. 0 210 308.

The most important advantage of the mass flow meters of principle also described in the patent specifications cited consists in the fact that the Coriolis force depends directly on the mass flow, essentially irrespective of the consistency (viscosity, physical state) of the flowing media.

A common feature of the solutions known so far is, that the Coriolis force generated by the forced periodic deformation (vibration) and distributed along the pipes also causes deformation which, in turn, will be superimposed on said forced deformation. The deformation caused by Coriolis force and the forced deformation are of different mode and phase, therefore, it is essentially the superposition of the two kinds of deformation that supplies the useful information, that is, the phase difference between the periodic movements measured at two suitably selected points of the pipe.

The principle of operation described above involves the following problems.

The amplitude of vibration generated by the Coriolis force and superimposed on the forced vibration (that is, the useful signal) depends, in addition to the magnitude of Coriolis force, on the rigidity and mass of the vibrating pipe as well as on the frequency and the rigidity, in order to obtain suitable useful signal. As a result of these limitations, vibrating pipes of relatively low rigidity (i.e. long and of small diameter) shall be used. It is of disadvantage in respect of practical implementation, as the most efficient way of reducing the noise sensitivity is to increase the operating frequency, on the one hand, and the pressure loss of the measuring instrument can be reduced most effectively by using short pipes which, in turn, increases the rigidity, on the other hand.

In addition to the structural limitations mentioned above, the measurement of the vibration results in density- and temperature-dependence of the measurement, i.e. the value of the constant K in equation (4) depends on the temperature and density of the fluid measured. These additional effects shall be continuously compensated depending on the accuracy requirements. Wide ranges of temperature and density result in significant increase in the error of compensation, otherwise, accurate compensation necessitates cost intensive measuring circuits with inherent reduction of reliability.

DISCLOSURE OF THE INVENTION

The invention is a method for measuring mass flow of a fluid stream, comprising the steps of inducing a fluid flow corresponding to the fluid stream through at least one resilient flow pipe, forcing the flow pipe to perform a vibration movement between an inlet cross section and an outlet cross section transverse to the axis of the flow pipe, sensing the effect of Coriolis forces in order to produce signals corresponding to the mass flow. The displacements caused by periodic Coriolis forces are counterbalanced by moment of inertia of a mechanism fastened to the pipe at a section located between the inlet cross section and the outlet cross section of the pipe, and producing electric signals by means of sensing mechanical stresses generated within said mechanism as a result of said counterbalancing and said forced vibration movement of the pipe, said electric signals being suitable to determine the mass flow.

According to another aspect the invention is a method for measuring mass flow of a fluid stream, comprising the steps of inducing a fluid flow corresponding to the fluid stream through at least two resilient flow pipes, forcing the flow pipes to perform a vibration movement between inlet cross sections and outlet cross sections transverse to the axis of the flow pipes, sensing the effect of Coriolis forces in order to produce signals corresponding to the mass flow. The displacements caused by periodic Coriolis forces are impeded by substantially rigid mechanism interconnecting the pipes mechanically, producing electric signals by means of sensing mechanical stresses generated within said mechanism as a result of impeding said displacements, said electric signals being suitable to determine the mass flow.

On the other hand the invention is an apparatus for measuring mass flow of a fluid stream, comprising an inlet conduit and an outlet conduit for the fluid stream, at least one resilient flow pipe having fixed mounting ends communicating with the inlet and outlet conduits, means for forcing the flow pipe to perform vibration movement between the mounting ends transverse to the axis of the flow pipe, means for sensing the effect of Coriolis forces in order to produce signals corresponding to the mass flow. The apparatus is characterized by a mechanism serving to counterbalance displacements caused by periodic Coriolis forces, said mechanism being fastened to a cross section on the pipe at which the function describing the vibration amplitude along the axis of the pipe has a local maximum, said mechanism comprising two interrelated parks sandwiching at least one piezoelectric crystal for sensing mechanical stresses.

According to a further aspects of the invention a mechanism serving to impeding the displacements caused by periodic Coriolis forces interconnects two cross sections of the pipes at which the function describing the vibration amplitude along the axis of the pipe has a local maximum thereby remaining the distance between said cross sections unchanged during vibration, being the direction and/or magnitude of flow through said cross sections differ from each other, said mechanism comprising two rigid bars, being said bars fastened at one end to said cross sections of the pipe, while their other ends embracing and mechanically pre-loading a unit of sandwich design consisting of two piezoelectric crystals that serves for sensing the mechanical stresses.

Still another aspect of the invention consists of a mechanism serving to impeding the displacements caused by periodic Coriolis forces interconnects two substantially stationary cross sections of the pipes, said mechanism comprising a component interconnecting said cross sections substantially rigidly and a first system of rods connected rigidly thereto, this system of rods and a second system of rods of similar design sandwich and pre-load a unit of sandwich design by means of the elastic mechanism that connects them coaxially together, said unit of sandwich design serving for the measurement of mechanical stresses and consisting of two piezoelectric crystals.

According to the present invention, it is not necessary that the Coriolis force generated by the forced vibration causes deformation. In fact, the sensing devices mounted on the vibrating pipes measure the mechanical stresses induced by the Coriolis force directly, and detector(s) sensing mechanical stresses are arranged in the mechanisms connecting the pipes together, respectively. These detectors supply output signals that represent the mechanical stresses proportional to the amplitude of forced vibration, on the one hand, and those generated by the Coriolis force, on the other hand.

By superimposing either the electric signals from the detectors, or the mechanical stresses themselves, two periodic signals with a phase difference corresponding to the mass flow rate can be generated. However, in such Cases, the factors that occur in the measurement of movement generated by the Coriolis force and cause the said additional problems and structural limitations associated with the interrelation between phase difference and mass flow, will be eliminated. A further advantage of the direct measurement of Coriolis force according to the present invention is, that the component generated by the forced vibration can be separated in a relatively simple way from that caused by the mass flow (i.e. the Coriolis force). In fact, their ratio is linearly proportional to the mass flow, irrespective of the value of that ratio. On the other hand, the phase difference between the movements measured is proportional to the arctg of the ratio of these two components, as it can be deducted from the equations of motion. It follows, that a linear relationship between the phase difference and mass flow exists only in the range of very small phase differences.

Further advantages of the invention will become apparent by particularly pointing out preferred embodiments of the invention. For the purpose of illustrating the invention, there are shown in the drawings forms which are presently preferred. It being understood, however, that the invention is not limited to the embodiments shown.

BEST MODE FOR CARRYING OUT THE INVENTION

In the drawings like reference numbers indicate like elements.

Figure 2:
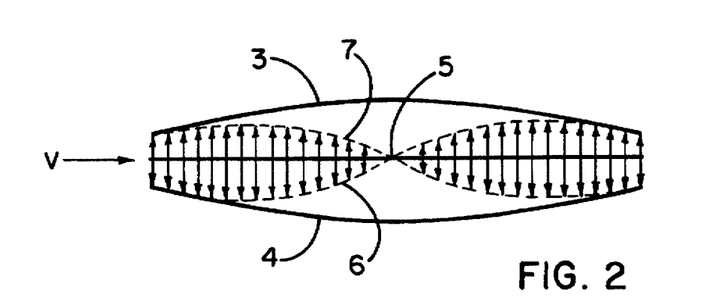
FIG. 2 shows Coriolis forces along a portion of a vibrating tube.

In FIG. 2 a portion of a vibrating pipe is shown. The pipe is shown in its two extreme positions designated with 3 and 4. The most important feature of the vibration is, that the function describing the amplitude distribution along the pipe axis has a maximum at cross section 5. In the pipe a fluid is flowing with a velocity V. The Coriolis forces have a distribution along the pipe axis as shown by curves 6 and 7. It can be shown that the function describing the distribution of Coriolis force along the pipe axis has a zero transition at the cross section 5, where the deflection of the pipe is maximum. Thus, the Coriolis force his a moment to this cross section of the pipe. It can be shown that this zero transition exists in the case of any form of vibrating pipes at cross sections where the amplitude of vibration has a local maximum.

Figure 3:
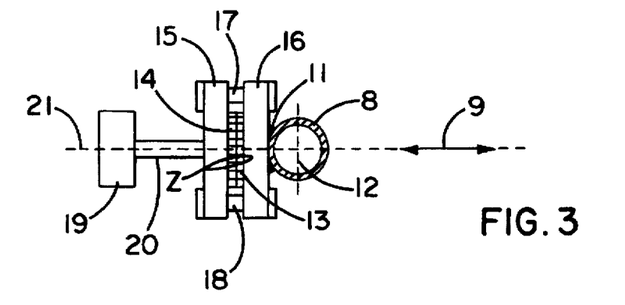
FIG. 3 is a front view of a sensing device of the apparatus according to the invention.
Figure 4:
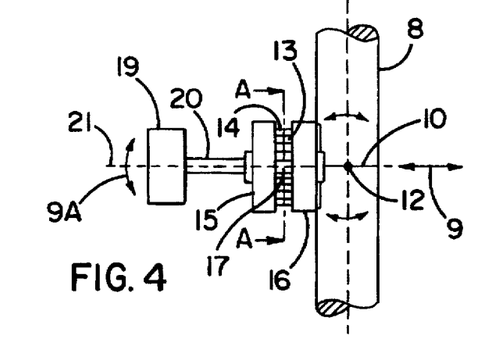
FIG. 4 is top view of the sensing device according to FIG. 3.
Figure 5:
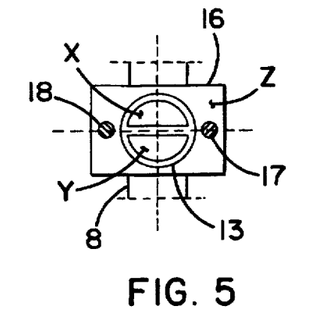
FIG. 5 is a sectional view along line A—A of FIG. 4.

FIGS. 3 to 5 show one exemplary embodiment of the mechanism for direct sensing of the moment generated by Coriolis force. During the forced vibration of a pipe 8 in a direction 9 perpendicular to the pipe axis, the function describing the amplitude distribution along the pipe axis has a maximum at cross section 10. The sensing device is rigidly mounted to the pipe 8 at 11 within close range of cross section 10. Its most important characteristic is, that its moment of inertia is relatively high related to the axis 12 perpendicular to the direction of vibration. Consequently, the moment caused by Coriolis force at that cross section is dynamically, so to say, supported, balanced by this moment of inertia. This supporting moment is directly sensed by a piezoelectric moment sensing device mounted in the mechanism. The electrodes of piezoelectric crystals 13 and 14 built in the moment sensing device are designed in a manner that the positive armatures of both crystals are divided into two equal parts along a line parallel to axis 12. The divided armatures of both crystals 13 and 14 face each other so as the separating lines are aligned and lie parallel to the axis of moment to be measured. The divided parts in contact are isolated from the body and form terminals X and Y of the sensing device, while the negative electrodes galvanically connected together by means of the metallic casing, form the third—grounded—terminal marked Z. The crystals 13 and 14 are mechanically pre-loaded by means of a mechanism having bolts 17, 18, as shown in FIG. 3, fastening the plates 15 and 16 together.

Major part of said moment of inertia will be determined by a counterbalance mass 19 and its distance from the axis 12. This distance can be set by selection of the length of a rigid bar 20. In no-flow state the cross section 10 moves along straight path which coincides with the axis 21 of moment sensing device. The mass force caused by the counterbalance mass 19 as a result of vibration along the axis 21 acts in the direction of axis 21 and loads both parts of the moment sensing crystals to an equal extent, which results in signals of the same phase (common mode) at the electrodes X and Y. This signal is proportional to the acceleration at point 10. On the other hand, the moment of Coriolis force generated under the effect, of flow and acting in the opposite sense to the moment of inertia of the mechanism induced signals of opposite phase, (differential mode) at the electrodes X and Y of piezoelectric crystals.

Figure 6:
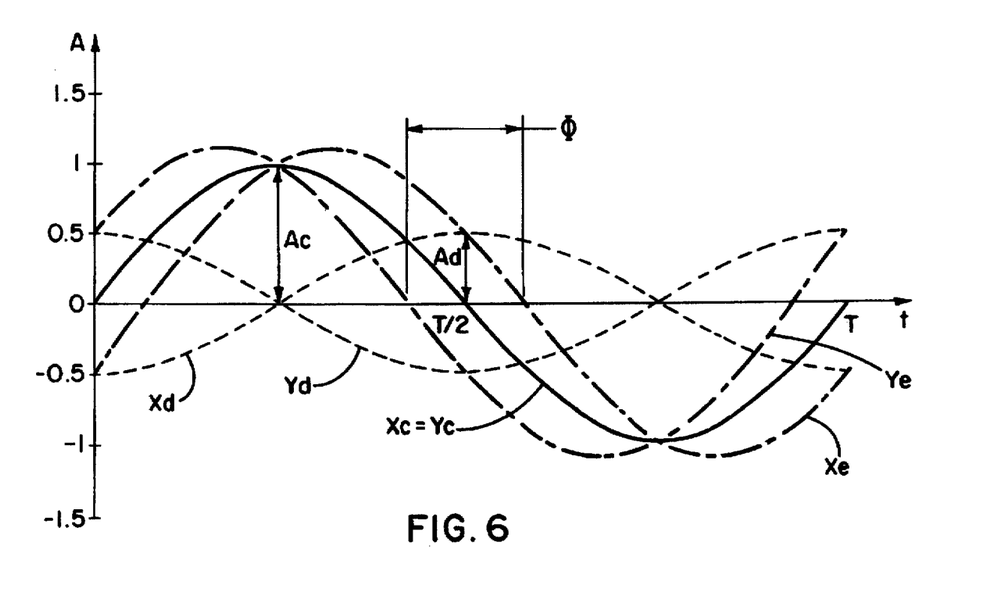
FIG. 6 is a diagram showing signals generated by sensing devices according to the invention.

FIG. 6 shows the time functions of short-circuit currents (output signals from charge amplifiers) from both electrodes X and Y towards the grounded electrode Z of the above described double piezoelectric crystal with divided electrodes. A further condition of this relative phase of periodic signals is, that the resonance frequency determined by the torsional elasticity of pipe 8 together with the sensing mechanism related to the axis 12 (FIG. 3) and by the moment of inertia related to the same axis will be significantly different from the forced vibration frequency of the vibrating pipe 8 (by a factor of at least two). The maximum values of common mode signals Xc, Yc of the same time function (which coincide as described above) represented by solid line and having an amplitude Ac coincide with the zero transitions of differential mode signals Xd, Yd represented by dotted lines and having an amplitude Ad. This is due to the fact that the common mode inertia forces are in phase with the acceleration of vibration, while the Coriolis moment of differential phase is in phase with the velocity of vibration. From this, and from the rule of addition of trigonometric functions, it follows that resulting signals Xe and Ye represented by generating line and the relative phase $\Phi$ of these resulting signals will be expressed as follows:

$$Xe = Xc + Xd \qquad (5)$$

$$Ye = Yc + Yd \qquad (6)$$

$$\Phi = \operatorname{arctg}(Ad/Ac) \qquad (7)$$

where Ad is the amplitude of differential mode signal,
Ac is the amplitude of common mode signal.

If $\Phi$ is not too large, the linear relationship (4) can be used to calculate the mass flow, as—due to the ratio in the operand of arctg—the amplitude of vibration and the constants of piezoelectric sensing devices have no effect. Should the value of $\Phi$ exceed 3 degrees, it is more reasonable to separate the differential mode signal from the common mode signal by using known electric circuits, and to generate the ratio directly.

Figure 7:
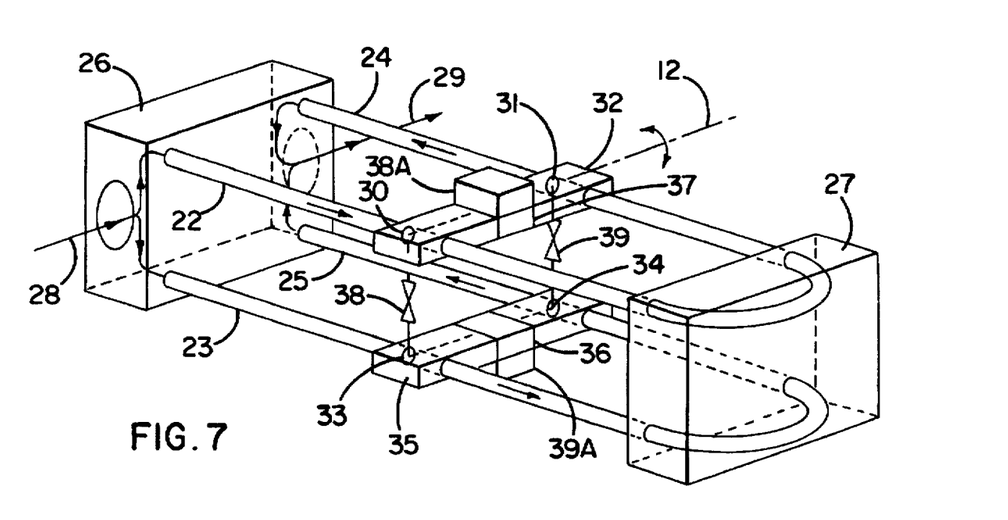
FIG. 7 is a perspective view of an embodiment of the invention.

FIG. 7 shows a preferred embodiment of the mass flow meter according to the invention. The fluid to be measured flows through four vibrating pipes 22, 23, 24 and 25 arranged parallel. The flow direction will be determined by flow deflectors 26 and 27. The flow deflector 26 divides inlet flow 28 to the mass flow meter into two parts, one part to the vibrating-pipe 22 and the other part to the vibrating pipe 23, and combines the flows coming through pipes 24 and 25 into the outlet flow 29 of the mass flow meter. The deflector 27 directs the flow through pipe 22 into the pipe 24 and the flow through pipe 23 into the pipe 25. The flow deflector 26 forms the base plate of the mass flow meter, which also contains the inlet and outlet pipe stubs of the mass flow meter. The flow deflector 27 is mechanically connected only to the vibrating pipes 22, 23, 24 and 25. The centrally located cross sections 30 and 31 of pipes 22 and 24 are connected together by means of a rigid bar 32. Similarly, the centrally located cross sections 33 and 34 of pipes 23 and 25 are connected together by means of rigid bar 35. In said rigid bars 32 and 35, devices 37 and 36, respectively, are arranges for sensing torsional moments in the axis of the rigid bars 32 and 35, respectively.

The pipe pairs 22, 24 and 23, 25 connected together by means of said rigid bars 32 and 35 are vibrated by means of any suitable vibrating devices 38 and 39 per se known at the resonance frequency of the pipe pairs. The vibrating devices 38 and 39 can be of electromagnetic type. During vibration, the displacement along the pipe axis has its maximum value at the central cross sections 30, 31, 33 and 34. The direction of vibration is perpendicular to the axis of bars 32, 35. The pipes 22 and 24 as well as 23 and 25 vibrate parallel together and in-phase. However, the pipes 22 and 23 as well as 24 and 25 vibrate in opposite direction and in opposite phase. Thus, the bars 32 and 35 move parallel, however, in opposite phase to each other during vibration.

Based on flow directions and vibration pattern, the Coriolis force distribution along the pipes can be determined by using the equation (1), taking FIGS. 1 and 2 into consideration. Based on qualitative analysis, the following conclusions can be taken.

The plane of the central cross sections 30, 31 and 33, 34, respectively, would rotate around the axes of rotation that coincide with straight lines connecting these cross sections together (for the cross sections 30 and 31 around axis 12)

only under the effect of the Coriolis force, however, the rotation is impeded by the rigid bars 32 and 35, respectively, connecting the cross sections together. At the same time, the moment sensing devices 36 and 37 mounted in the bars 35 and 32, respectively, supply signals proportional to the moment caused by Coriolis force.

The periodic moments generated in the bars 32, 35 are of opposite phase.

The extremities of time function describing the periodic torsional moment generated in any of the bars 32, 35 connecting the central cross sections together coincide with the zero transitions of time function describing the periodic forces due to the acceleration of masses 38A, and 39A as a result of parallel vibration of the bars 32 and 35, respectively. This results from the fact that, due to the vibration of low damping (i.e. high quality factor) at resonance frequency, the periodic movements (and the forces and mechanical stresses thus generated) are nearly sinusoidal functions and, consequently, the time functions of displacement, velocity and acceleration differ from each other by $\pi/2$ in phase as a result of derivation.

Figure 8:
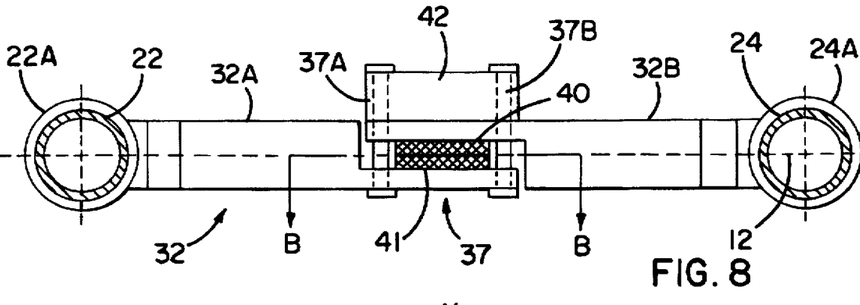
FIG. 8 is a front view of the sensing device of the embodiment according to FIG. 7.
Figure 9:
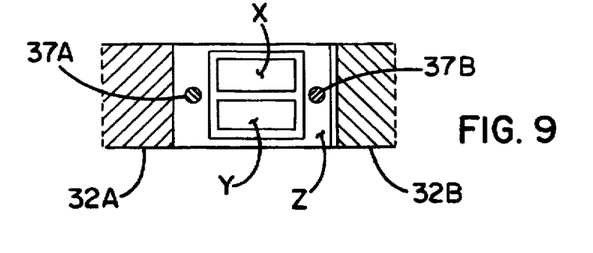
FIG. 9 is a sectional view along line B—B of FIG. 8.

In FIGS. 8 and 9 a preferred embodiment of the connecting bars 32, 35 provided with piezoelectric sensing devices 37, 36 suitable to measure both moment and acceleration is shown. The bar 32 consists of two arms 32A and 32B, one end of which being rigidly connected to pipe clamps 22A and 24A, respectively, the other ends of which being connected to each other by bolts 37A and 37B sandwiching piezoelectric crystals 40 and 41. A mass 42 is positioned over the piezoelectric crystals 40 and 41. Similarly to the design shown in FIGS. 3 to 5, the electrodes of piezoelectric crystals 40 and 41 are designed in a manner that the positive armatures of both crystals are divided into two equal parts along a line. The divided armatures of both crystals 40, 41 face each other so as the separating lines are aligned and also coincide with the axis 12 of the moment to be measured. The divided parts in contact are isolated from the body and form the terminals X and Y of the sensing device, while the negative electrodes galvanically connected together by means of the metallic casing form the third, grounded electrode marked Z. It can be shown, that under the effect of the torsional moment, proportional to the Coriolis force as described above, acting on the bars 32, 35, signals of opposite phase will be generated at electrodes X and Y, while the inertia of the mass 42 due to the acceleration of forced vibration in the plane perpendicular to both the axis of bars 32, 35 and the plane of piezoelectric crystals causes signals of the same phase to be generated at the electrodes X and Y.

The time functions of electric signals that appear at terminals X and Y relating to grounded terminal Z of the moment sensing device 37 shown in FIGS. 8 and 9 will be as represented in FIG. 6. The signals of no-flow state are represented by solid lines. In this state, signals will only be generated by the acceleration of parallel vibration of the bars 32, 35. The time functions of these signals Xc, Yc coincide. Dotted lines represent the signals of opposite phase Xd, Yd generated by the moment as a result of flow, that differ by $\pi/2$ from the signals induced by acceleration. Generating line represents the resulting signals Xe, Ye that can be measured in the case of non-zero flow. These signals are composed of the signals represented by the solid lines and dotted lines. In fact, these signals are added in the form of mechanical stresses in the sensing piezoelectric device. The phase difference $\Phi$ between the resulting signals Xe and Ye corresponds to equation (7).

As a result of the location of masses 38A and 39A shown in FIG. 7 as well as of the conditions of flow and vibration, the differential mode signals will be of opposite phase, while the common mode signals will be of the same phase related to the electrodes of both X and Y of the lower and upper bars. Consequently, if the signal that appears at the electrode X of one of the bars will be added to the signal that appears at the electrode Y or the other bar, the time functions of the resulting signal thus established will also be as shown in FIG. 6. This can be mathematically described by the equations as follows.

Signal appearing at the electrodes of the bar 32:

$$X1e = X1c + X1d \quad (8)$$

$$Y1e = Y1c + Y1d \quad (9)$$

Signals appearing at the electrodes of the bar 35:

$$X2e = X2c + X2d \quad (10)$$

$$Y2e = Y2c + Y2d \quad (12)$$

Resulting signals after summation:

$$X = X1e + Y2e = X1c + Y2c + X1d + Y2d \quad (13)$$

$$Y = X2e + Y1e = X2c + Y1c + X2d + Y1d \quad (14)$$

In this case, the ratio of common mode and differential mode amplitudes as well as the phase difference $\Phi$ between the resulting signals will be proportional to the sum of mass flow rates through the two pipes 22, 24. The time functions will also be here as shown in FIG. 6.

In the pipe arrangement as shown in FIG. 7 sensing devices according to FIGS. 3 to 5 are also applicable. In this case, instead of the rigid bars 32, 35 with sensing devices 36, 37, there are four sensing devices of FIG. 3 rigidly connected to pipes 22, 24, 23 and 25, respectively, at cross sections 30, 31, 33 and 34 with their axes 21 (FIG. 3) being perpendicular. The sensing devices connected to the pipes 22 and 24 are positioned upwards, and the sensing devices connected to the pipes 23 and 25 are positioned downwards. The excitation takes place by the vibrating devices 38 and 39. Signals of sensing devices connected to pipes 22 and 25 are of the same function, therefore, they can be connected in parallel. Similarly, signals of sensing devices connected to pipes 23 and 24 are of the same function, so they can also be connected in parallel.

Figure 10:
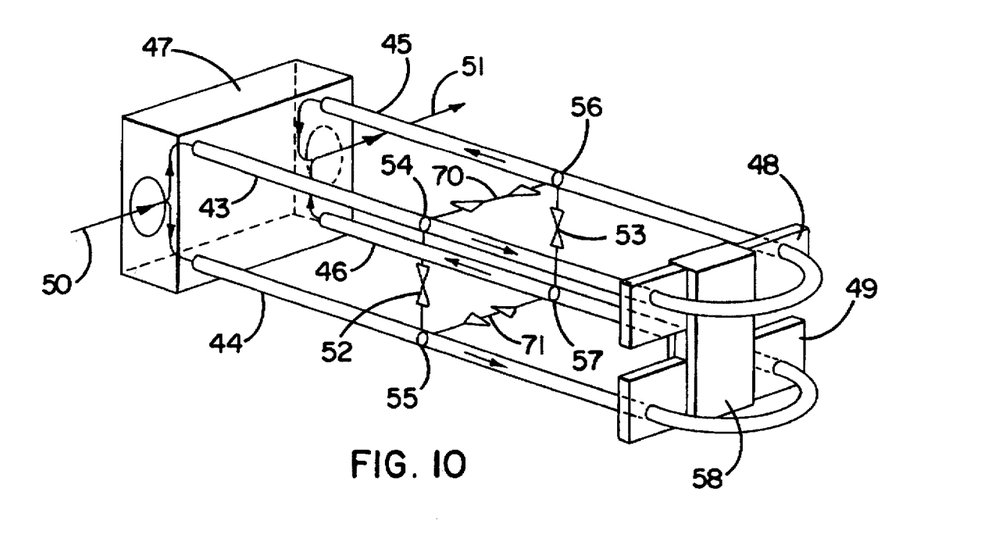
FIG. 10 is a perspective view of another embodiment of the invention.

FIG. 10 shows another embodiment of direct sensing of Coriolis force. Similarly to the above method, the fluid to be measured flows through four straight vibrating pipes 43, 44, 45 and 46 arranged parallel to each other. The flow direction is determined by deflectors 47, 48 and 49. The deflector 47 divides the inlet flow 50 to the mass flow meter into two parts, one part through vibrating pipe 43 and the other part through the vibrating pipe 44, and combines the flows through pipes 45 and 46 into an outlet flow 51 from the mass flow meter. The deflector 48 directs the medium flowing through pipe 43 to the pipe 45, while the deflector 49 directs the medium flowing through pipe 44 to the pipe 46.

The pipes 43, 44, 45 and 46 are forced to vibrate at their resonance frequency by electromagnetic vibrating devices 52 and 53, which are driven in-phase as shown in FIG. 10 by arrows. During vibration, the displacement has maximum values at the central cross sections 54, 55, 56 and 57. The pipes 43 and 45, as well as 44 and 46 vibrate parallel to each other and in-phase, while the pipes 43, 44 and 45, 46 vibrate in opposite direction and in opposite phase.

The deflector 47 forms the base plate of the mass flow meter, which also contains the inlet and outlet pipe stubs.

The deflectors 48 and 49 are fastened only to the vibrating pipes. However, they are also connected together by means of a sensing device 58. The sensing device 58 has the task of sensing the mechanical tensile and compression stresses induced by the forced vibration between the deflectors 48 and 49, as well as sensing the torsional displacement of the same elements around the axis parallel to the axis of vibrating pipes, induced by Coriolis force as a result of flow.

Figure 11:
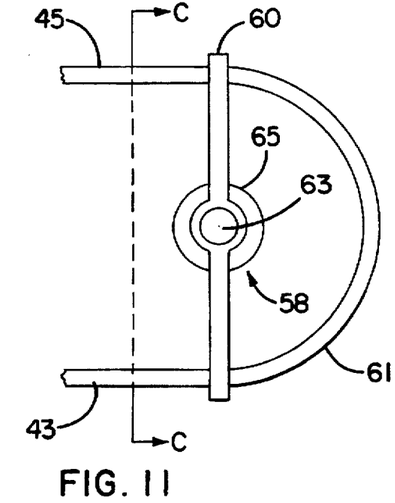
FIG. 11 is a top view of a sensing device of the embodiment according to FIG. 10.
Figure 12:
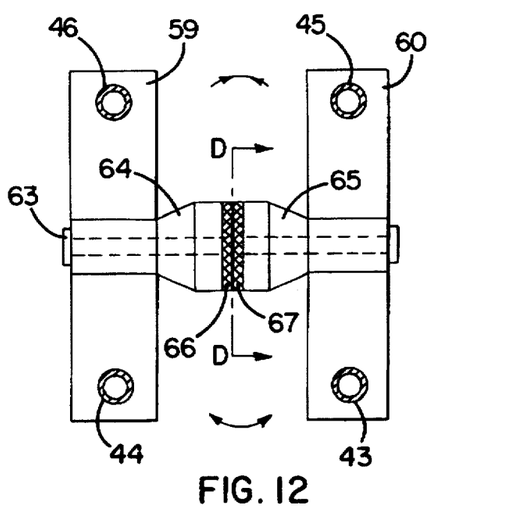
FIG. 12 is a sectional view along line C—C of FIG. 11.
Figure 13:
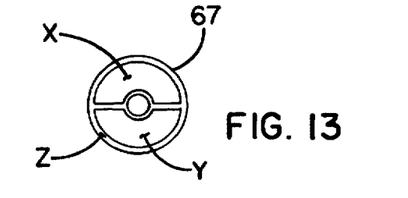
FIG. 13 is a sectional view along line D—D of FIG. 12.

FIGS. 11 to 13 show a preferred embodiment of the deflectors 48 and 49 as well as the sensing device 58 of FIG. 10. Plates 59 and 60 fastening the ends of straight vibrating pipes 44, 46 and 43, 45, respectively, together with associated pipe bents 61 and 62 form the flow deflectors 48 and 49. The plates 59 and 60 are interconnected by means of a connecting bar 63 through supporting elements 64 and 65 sandwiching piezoelectric crystals 66 and 67. Similarly to the embodiment shown in FIGS. 3 to 5, the electrodes of piezoelectric crystals 66 and 67 are designed in a manner that the positive armatures of both crystals are divided into two equal parts along a line. The divided armatures of both crystals 66, 67 face each other so as the separating lines are aligned and lie parallel to the axis of vibrating pipes 43, 44, 45 and 46. The divided parts in contact are isolated from the body and form the terminals X and Y of the sensing device, while the negative electrodes galvanically connected together by means of the metallic casing form the third, grounded electrode marked Z. Based on FIG. 2 it can be shown, that under the effect of the torsional moment caused by Coriolis force due to the flow, the plates 59 and 60 tend to rotate around an axis perpendicular to their plane. Under the effect of mechanical stresses thus induced, signals of opposite phase (differential mode) will be generated at electrodes X and Y, while the mechanical stresses induced by forced vibration perpendicular to the plane of piezoelectric crystals 66, 67 cause signals of same phase (common mode) to be generated at the electrodes X and Y. The amplitude and phase of these latter signals will depend not only on the movement of the vibrating pipes, but also on the periodic force caused by the driving mechanism in order to upkeep the forced vibration. The extent of this represents information which is not negligible in respect of the state (quality factor, damping and balance) of the vibrating system. However, the useful signal in respect of mass flow measurement will be the differential mode signal from the sensing device 58 (FIG. 10):

$$Xe-Ye=Ad.cos\ (\Omega.t) \quad (14)$$

where Ad is amplitude of differential mode signal.

Thus, the mass flow rate Q can be calculated by using the formula as follows:

$$Q=K.Ad/Ac \quad (15)$$

where K is a constant.

The phase difference between signals Xe and Ye is proportional to the mass flow as the relation between the common mode signals and the differential mode signals corresponds to FIG. 6.

If Φ is not too large, the linear equation (4) can be used to calculate the mass flow, as—due to the ratio in the operand of arctg—the amplitude of vibration and the constants of piezoelectric sensing devices have no effect. If the value of Φ exceeds 3 degrees, it is more reasonable to generate the ratio directly according to equation (15) instead of measuring Φ.

FIG. 10 also shows another embodiment of direct Coriolis force measurement. The arrangement of the pipes 43, 44, 45 and 46, the flow deflectors 47, 48 and 49 and flow directions are the same as described above. The difference exists in the way of forcing vibration. Instead of vibrating devices 52 and 53 operated in-phase, there are vibrating devices 70 and 71 operating in opposite phase as shown in FIG. 10 by arrows to vibrate the pipes 43, 44, 45 and 46 at their resonance frequencies. Also in this case, the displacements have their maximum values at the central cross sections 54, 55, 56 and 57 during vibration, with the difference that the pipes 43, 45 and 44, 46, respectively, will vibrate in opposite direction in a manner that at the time of minimum distance between cross sections 54 and 56, the distance between cross sections 55 and 57 will be maximum.

Similarly, the sensing device 58 has the task of sensing the mechanical stresses between deflectors 48 and 49. As shown in FIG. 2, the moments caused by Coriolis force on the pipes 43 and 45 are of same sense. Due to the vibration forced in opposite phase, the moments caused by Coriolis force on the pipes 44, 46 are of sense opposite to those acting on the pipes 43 and 45. If the sensing device 58 is designed as shown in FIGS. 11 to 13, the moments caused by Coriolis force Hill be summed along the separating lines of divided electrodes of piezoelectric crystals 66 and 67, thus generating differential mode signals.

Figure 14:
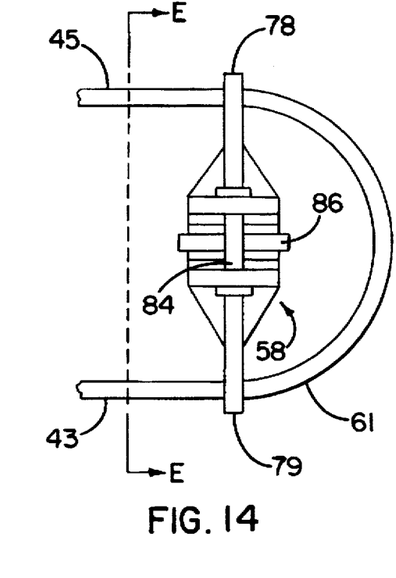
FIG. 14 is a top view of another type of sensing device of the embodiment according to FIG. 10.
Figure 15:
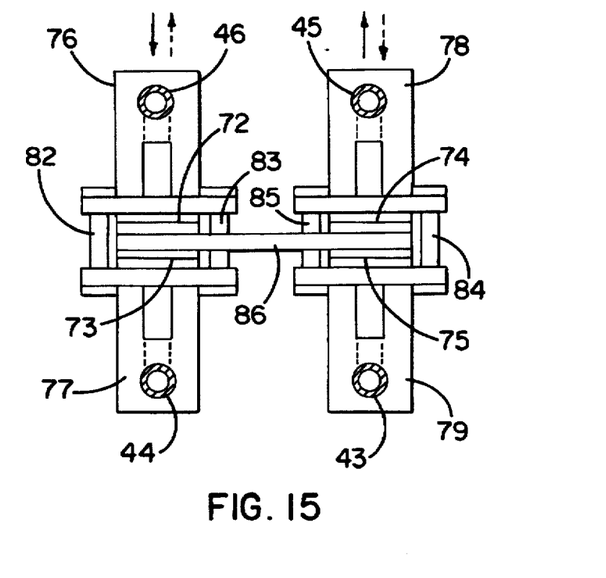
FIG. 15 is a sectional view along line E—E of FIG. 14.

FIGS. 14 and 15 show a further embodiment of the sensing device 58 in the arrangement shown in FIG. 10, where the vibrating devices 70, 71 keep the pipes 43, 44, 45 and 46 at their resonance frequencies as described above. The sensing device 58 includes four pairs of piezoelectric crystals 72, 73, 74 and 75 of the similar design as shown in FIGS. 3 to 5, however, without the division at the armatures. In this case, each of the flow deflectors 48, 49 of FIG. 10 consists of two pipe bents 61, 62 and two parts 76, 77 and 78, 79, respectively, fastened together by means of flexible bolts 82, 83 and 84, 85, respectively, sandwiching said pairs of piezoelectric crystals 72, 73, 74 and 75. The moment caused by Coriolis force, that can be deducted on the basis of FIG. 2 from the conditions of flow and vibration, will be transferred by a plate 86 between the pairs of piezoelectric crystals 72, 73, 74 and 75. In this arrangement:

$$X=p1-p2 \quad (15)$$

$$Y=p3-p4 \quad (16)$$

where p1, p2, p3, p4 are electric signals from the pairs of piezoelectric crystals 72, 73, 74 and 75, respectively.

The phase difference between signals X and Y is proportional to the mass flow as the relation between the common mode signals and the differential mode signals corresponds to FIG. 6.

We claim:

1. An apparatus for measuring mass flow of a fluid stream, comprising: an inlet conduit and an outlet conduit for said fluid stream, at least one resilient flow pipe having fixed mounting ends communicating with said inlet and outlet conduits, means for forcing said flow pipe to perform vibration movement between said mounting ends transverse to the axis of said flow pipe, a mechanism for counterbalancing displacements caused by periodic Coriolis forces, said mechanism being fastened to a cross section of said flow pipe at which the function describing the vibration amplitude along the axis of said flow pipe has a local maximum, said mechanism comprising a sandwich structure having two interrelated parts and two piezoelectric crystals disposed between said interrelated parts for sensing mechanical stresses, each of said piezoelectric crystals having a positive armature and a negative armature, said positive armatures being divided into two parts along separating lines, said piezoelectric crystals being in contact with their divided positive armatures facing each other, said separating lines being aligned and parallel to the axis of moment caused by the Coriolis force, said divided armatures being isolated from a grounded body of the apparatus and forming a first terminal and a second terminal, while said negative armatures of said piezoelectric crystals are connected galvanically together by means of a mounting frame forming a grounded third terminal, and means for producing signals corresponding to the mass flow on the basis of signals of said piezoelectric crystals.

2. An apparatus for measuring mass flow of a fluid stream, comprising: an inlet conduit and an outlet conduit for said fluid stream, at least two resilient flow pipes having fixed mounting ends communicating with said inlet and outlet conduits, means for forcing said flow pipes to perform vibration movement between said mounting ends transverse to the axes of said flow pipes, a mechanism for impeding displacements caused by periodic Coriolis forces, said mechanism interconnecting two cross sections of said flow pipes at which the function describing the vibration amplitude along the axes of said flow pipes has a local maximum thereby keeping the distance between said cross sections unchanged during vibration, wherein the direction and/or magnitude of flow through said cross sections differ from each other, said mechanism comprising two rigid arms being fastened at one of their ends to said cross sections of said flow pipes while their other ends embrace and mechanically pre-load two piezoelectric crystals for sensing mechanical stresses, each of said piezoelectric crystals having a positive armature and a negative armature, said positive armatures being divided into two parts along separating lines, said piezoelectric crystals being in contact with their divided positive armatures facing each other, said separating lines being aligned and parallel to a straight line that connects the centers of said cross sections together, said divided parts in contact being isolated from a grounded body of the apparatus and forming a first terminal and a second terminal, while said negative armatures of said piezoelectric crystals are connected galvanically together by means of a mounting frame forming a grounded third terminal, and means for producing signals corresponding to the mass flow on the basis of signals of said piezoelectric crystals.

3. An apparatus for measuring mass flow of a fluid stream, comprising: an inlet conduit and an outlet conduit for said fluid stream, at least two resilient flow pipes having fixed mounting ends communicating with said inlet and outlet conduits, means for forcing said flow pipes to perform vibration movement between said mounting ends transverse to the axes of said flow pipes, a mechanism for impeding displacements caused by periodic Coriolis forces, said mechanism comprising members interconnecting substantially stationary cross sections of said flow pipes, substantially rigidly and connecting elements being attached rigidly between said members, said connecting elements embracing and mechanically pre-loading two piezoelectric crystals for sensing mechanical stresses, each of said piezoelectric crystals having a positive armature and a negative armature, said positive armatures being divided into two parts along separating lines, said piezoelectric crystals being in contact with their divided positive armatures facing each other, said separating lines being aligned and parallel to the axis of moment caused by the Coriolis force on the center of said divided armatures, said divided parts in contact being isolated from a grounded body of the apparatus and forming a first terminal and a second terminal, while said negative armatures of said piezoelectric crystals are connected galvanically together by means of a mounting frame forming a grounded third terminal, and means producing signals corresponding to the mass flow on the basis of signals of said piezoelectric crystals.

* * * * *